United States Patent [19]

Yu et al.

[11] Patent Number: 5,274,744
[45] Date of Patent: Dec. 28, 1993

[54] NEURAL NETWORK FOR PERFORMING A RELAXATION PROCESS

[75] Inventors: Shiaw-Shian Yu; Wen-Hsiang Tsai, both of Hsinchu, Taiwan

[73] Assignee: Industrial Technology Research Institute, Hsinchu, Taiwan

[21] Appl. No.: 823,241

[22] Filed: Jan. 21, 1992

[51] Int. Cl.$^5$ .............................. G06F 15/00
[52] U.S. Cl. ........................... 395/24; 395/13; 395/23; 395/25; 395/27
[58] Field of Search .............. 395/24, 23, 13, 25, 395/27

[56] References Cited

U.S. PATENT DOCUMENTS

| | | | |
|---|---|---|---|
| 4,926,064 | 5/1990 | Tapang | 395/24 |
| 5,014,219 | 5/1991 | White | 364/200 |
| 5,073,867 | 12/1991 | Murphy et al. | 395/27 |
| 5,134,685 | 7/1992 | Rosenbluth | 395/23 |
| 5,148,513 | 9/1992 | Koza et al. | 395/13 |
| 5,157,738 | 10/1992 | Carpenter et al. | 395/25 |

OTHER PUBLICATIONS

"Automatic Test Generation Using Neural Networks", Srimat T. Chakradhar, IEEE International Joint Conf. on Neural Nets 1991.
"Toward Massively Parallel Automatic Test Generation", Srimat T. Chakradhar, IEEE Transactions on Computer-Aided Design of Int. Circuits Sep. 1990.
A. Rosenfeld et al, "Digital Picture Processing," 2d ed., vol. 2, Academic Press, 1982, pp. 152-187.
J. J. Hopfield et al, "Neural Computation of Decisions in Optimization Problems," Bioolgical Cybernetics 52:141-152, Jul. 1985, pp. 139-150.
J. J. Hopfield et al, "Neurons With Graded Response Have Collective Computational Properties Like Those of Two-State Neurons," Proc. of the National Academy of Sciences, USA, 81:3088-3092, 1984, pp. 577-583.
J. Hutchinson et al, "Computing Motion Using Analog and Binary Resistive Networks," Computer, Mar. 1988, pp. 52-63.

Primary Examiner—Michael R. Fleming
Assistant Examiner—Tariq R. Hafiz
Attorney, Agent, or Firm—Meltzer, Lippe, Goldstein

[57] ABSTRACT

In accordance with the present invention, a neural network comprising an array of neurons (i.e. processing nodes) interconnected by synapses (i.e. weighted transmission links) is utilized to carry out a probabilistic relaxation process. The inventive neural network is especially suited for carrying out a variety of image processing tasks such as thresholding.

8 Claims, 2 Drawing Sheets

NEURAL NETWORK FOR PERFORMING A RELAXATION PROCESS

FIELD OF THE INVENTION

The present invention relates to a neural network for performing a probabilistic relaxation process.

BACKGROUND OF THE INVENTION

A. Relaxation Process

The relaxation process is a technique for using contextual information to reduce local ambiguity and achieve global consistency. The relaxation process has been applied successfully to a variety of image processing tasks such as scene labeling (see e.g., A. Rosenfeld, R. A. Hummel, and S. W. Zucker, "Scene Labeling by Relaxation Operations," IEEE Trans. on System, Man, and Cybernetics, SMC-6:420-433, June 1976; S. W. Zucker, E. V. Krishnamurthy, and R. L. Haar, "Relaxation Processes for Scene Labeling: Convergence, Speed, and Stability," IEEE Trans. on System, Man, and Cybernetics, SMC-8:41-48, January 1978), shape matching (see e.g., B. Bhanu and O. D. Faugeras, "Shape Matching of 2-d Object Using a Hierarchical Stochastic Labeling Technique," In Proc. of Conf. on Pattern Recognition and Image Proc., pages 688-690, Las Vegas, Nev., June 1982 and C. Wang, H. Sun, S. Yada, and A. Rosenfeld, "Some Experiments in Relaxation Image Matching Using Corner Features," Pattern Recognition, 16:167-182, 1983) handwritten character recognition (see e.g., H. Ogawa and K. Taniguchi, "On Machine Recognition of Hand-printed Chinese Characters by Feature Relaxation," Pattern Recognition, 21:1-7, 1988 and I. Sekita, K. Toraichi, R. Mori, K. Yamamoto, and H. Yamada, "Feature Extraction of Hand-written Japanese Characters by Spline Functions for Relaxation," Pattern Recognition, 21:9-17, 1988) and thinning (see e.g., Shiaw-Shian Yu and Wen-Hsiang Tsai, "A New Thinning Algorithm for Gray-Scale Images by the Relaxation Technique," Pattern Recognition, 23(10):1067-1076, 1990).

There are three types of relaxation processes: discrete relaxation, fuzzy relaxation, and probabilistic relaxation. The present invention is concerned with probabilistic relaxation, which is discussed in detail in Azriel Rosenfeld and Avinash C. Kak, "Digital Picture Processing", Second Edition Volume 2, Academic Press, 1982 pp 152-187.

The probabilistic relaxation precess is as follows.

Suppose that there is a set of n objects $A_1, \ldots, A_n$ that are to be classified into m classes $C_1, \ldots, C_m$. (Illustratively, in an image processing application, the objects are pixels and the classes are gray scales.) Suppose further that the class assignments of the objects are interdependent: in other words, for each pair of class assignments $A_i \epsilon C_j$ and $A_h \epsilon C_k$, there is a quantitative measure of the compatibility of this pair, which is denoted by $c(i,j; h,k)$. For concreteness, it may be assumed that positive values of $c(i,j; h,k)$ represent compatibility of $A_i \epsilon C_j$ with $A_h \epsilon C_k$; negative values represent incompatibility; and zero represents "don't care." It may be further assumed that the c's (i.e., the compatibilities) always lie in some fixed range, say $[-1,1]$. Note that the c's need not be symmetric, i.e., it is not necessary that $c(i,j; h,k) = c(h,k;i,j)$.

Let $p^{(0)}_{ij}$ be an initial estimate of the probability that $A_i \epsilon C_j$, $1 \leq i \leq n, 1 \leq j \leq m$. Thus for each value of i we have $0 < p^{(0)}_{in} \leq 1$ and $$\sum_{j=1}^{m} p^{(o)}_{ij} = 1.$$

There is now described an iterative method of computing successive "probability estimates" $p^{(r)}_{in}, r = 1, 2, \ldots$, based on the initial probabilities and the compatibilities. These successively calculated p's are called probability estimates because they satisfy $0 \leq p^{(r)}_{ij} \leq 1$ and $$\sum_{j=1}^{m} p^{(r)}_{ij} = 1$$

for each i and r.

Consider how $p_{ij}$ should be adjusted at each iteration step, based on the current values of the other p's and on the values of the c's. Intuitively, if $p_{hk}$ is high and $c(i,j;h,k)$ is positive, we want to increase $P_{inj}$, since it is compatible with the high-probability event $A_h \epsilon C_k$. Similarly, if $p_{hk}$ is high and $c(i,j;h,k)$ is negative, we want to decrease $p_{ij}$, since it is incompatible with $A_h \epsilon C_k$, which has high probability. On the other hand, if $p_{hk}$ is low, or if $c(i,j; h,k)$ is near zero, we do not want to change $p_{hk}$ very much, since $A_h \epsilon C_k$ either has low probability, or is essentially irrelevant to $A_i \epsilon C_j$. A very simple way of defining an increment to $p_{ij}$ that has these desired properties is to use the product $c(i,j; h,k)p_{hk}$.

How should these increments be combined for all the h's and k's? The simplest way of doing this is to linearly combine them. For each object $A_h$, the increments are summed over all the possible classes $C_k$, i.e.

$$\sum_{k=1}^{m} c(i,j;h,k)p_{hk} \tag{1}$$

This sum will be positive if the high-probability $C_k$'s for $A_h$ are compatible with $A_i \epsilon C_j$, negative if they are incompatible, and near zero if they are irrelevant. Note that this sum is still in the range $[-1,1]$ since $$\sum_{k=1}^{m} p_{hk} = 1.$$

These net increments can then be averaged for all objects $A_h \neq A_i$, i.e., there is computed:

$$q^{(r)}_{ij} = \frac{1}{n-1} \sum_{h=1, h \neq i}^{n} \left( \sum_{k=1}^{m} c(i,j;h,k)p^{(r)}_{hk} \right). \tag{2}$$

This too is still in the range $[-1,1]$.

The increment $q_{ij}$ is now applied in order to obtain new estimates for $p_{ij}$. It is desirable for the new estimates to be nonnegative and to satisfy $$\sum_{j=1}^{m} p_{ij} = 1.$$

A simple way of insuring nonnegativeness is to multiply $p_{ij}$ by $1 + q_{ij}$; this quantity is nonnegative, since $q_{ij} \geq -1$. Note that if $q_{ij}$ is negative, P decreases, and if positive, it increases, as desired. Finally, the new estimates of $p_{ij}$ are normalized by dividing each of them (for a given i) by their sum; this insures that the $p_{ij}$'s for a given i sum to 1. The incrementation process is thus defined by $$p_{ij}^{(r+1)} = \frac{p_{ij}^{(r)}(1 + q_{ij}^{(r)})}{\sum_{j=1}^{m} p_{ij}^{(r)}(1 + q_{ij}^{(r)})}. \quad (3)$$

where $$q_{ij}^{(r)} = \frac{1}{n-1} \sum_{h=1, h \neq i}^{n} \left( \sum_{k=1}^{m} c(i,j;h,k) p_{hk}^{(r)} \right). \quad (4)$$

Note that if any $p^{(r)}$ is 0, it can never become nonzero, and if it is 1, it cannot change.

The relaxation process operates as follows. Initial estimates of the probabilities $p_{ik}$ are determined as well as estimates of the compatibilities. The system then evolves in time according to equations (3) and (4). Each $p_{ij}$ eventually reaches the value of one or zero indicating definitively whether or not the object $A_i$ is in the class $C_j$.

As an example of the relaxation process, consider how the relaxation process might be applied to classifying pixels into dark and light classes based on their gray levels, i.e., to thresholding. This example is especially simple for two reasons:

1) There are only two classes 1 and 0, corresponding to object and background gray levels.
2) The compatibilities between neighboring pairs of points should all be alike, independent of direction, unless the picture is directionally biased.

Thus, for each pixel $A_{x,y}$, with coordinates x and y, there are only two probabilities $p_{(x,y)0}$ and $p_{(x,y)1}$ where $p_{(x,y)1} = 1 - p_{(x,y)0}$. Moreover, for each pixel $A_{x,y}$ and any of its eight neighboring pixels, with coordinates u, v, there are only four compatibilities c((x,y,0-);(u,v),0),c((x,y),0;(u,v),1) c((x,y),1;(u,v),0) and c((x,y),1-,(u,v),1). All other compatibilities are assumed to be zero in this example.

To assign an initial probability values to each pixel, the following scheme may be utilized (see e.g. A. Rosenfeld and R. C. Smith, "Thresholding Using Relaxation", IEEE Transactions On Pattern Analysis and Machine Intelligence, PAMI-3:508-606, 1981) Let $G_{x,y}$ be the gray level of pixel $A_{x,y}$, m be the mean gray level, and let O and B be the gray levels corresponding to object and background, then it is defined:

$$p_{(x,y)1}^{(0)} = \frac{1}{2} + \frac{G_{x,y} - m}{2(B - m)} \text{ for } G_{x,y} > m \quad (5)$$

$$p_{(x,y)0}^{(0)} = \frac{1}{2} + \frac{m - G_{x,y}}{2(m - O)} \text{ for } G_{x,y} \leq m. \quad (6)$$

A general method of defining compatibility coefficients based on the mutual information of the classes at neighboring pixels was proposed in S. Peleg et al, "Determining Compatibility Coefficients for Curve Enhancement Relaxation Processes", IEEE Trans. on Systems, Man and Cybernetics, SMC 8:548-555 July 1978.

Once the initial probability estimates $P^{(0)}(x,y)$ and $P(0)_{(x,y)0}$ are obtained and values for the compatibility coefficients are obtained, the iterations of the probabilities are calculated according to equations (3) and (4) until each probability reaches a value of zero or one which determines definitively whether the corresponding pixel has the object gray scale value 0 or the background gray scale value B.

B. Neural Network

A neural network comprises a plurality of processing nodes (known as neurons) which are interconnected by weighted connection paths (known as synapses). Typically, the processing nodes are arranged in groups or layers. One of the most famous single layer neural networks is the Hopfield network (see e.g., J. J. Hopfield, "Neurons with Graded Response Have Collective Computational Properties Like Those of Two-stated Neurons," Proc. of the National Academy of Science, USA, 81:3088-3092, 1984 and J. J. Hopfield and D. W. Tank, "Neural Computation of Decisions in Optimization Problems," Biological Cybernetics, 52:141-152, July 1985).

The Hopfield network is a recurrent network containing feedback paths from the node outputs back to the node inputs so the response of such a network is dynamic. This means that after applying a new input, the output is calculated and fed back to modify the input. The output is then recalculated, and the process is repeated again and again Successive iterations produce smaller and smaller output changes, until eventually the outputs become constant and the network stable.

In short, the neural network is a computational network with a massively parallel execution capability.

The connection weights between the neurons in the network may be considered to form a matrix T; where the matrix element $T_{ij}$ is the weight of the connection path between the output of the $j^{th}$ processing node and the input of the $i^{th}$ processing node. If $T_{in} = T_{ji}$ and $T_{ii} = 0$ for all i, the network is stable.

Consider the special case of a Hopfield network with a symmetric matrix. The input to the $j^{it}$ processing node comes from two sources, i.e., there is an external input and there are inputs from other processing nodes. The total input signal $u_i$ to the processing node i is then $$u_i = \sum_{j \neq i} T_{ij} V_j + I_i \quad (7)$$

where the $v_j$ represents the output of the $j^{th}$ processing node, $T_{ij}$ is the weight of the connection between the processing nodes i and j, and $I_i$ represents the external input bias value which is applied to the input of the processing node i.

In general, the transfer function characteristic between the input and the output of a processing node is non-linear. For example, the output values $v_i$ may be updated according to the rule $$V_i \rightarrow 0 \text{ if } \sum_{j \neq i} T_{ij} V_j + I_i < \theta_i, \text{ or} \quad (8)$$

$$V_i \rightarrow 1 \text{ if } \sum_{j \neq i} T_{ij} V_j + I_i > \theta_i$$

where $\theta_i$ is a threshold value for the $i^{th}$ processing node which may be taken to be zero. The processing nodes in this case are interrogated and updated in a stochastic asynchronous manner.

A quantity to describe the state of the network called energy is defined as $$E = -\frac{1}{2} \sum_{i} \sum_{j \neq i} T_{ij} V_i V_j - \sum_{i} V_i I_i. \qquad (9)$$

The change $\Delta E$ in E due to the state change $\Delta V_i$ of the processing node i is given by $$\Delta E = -\left[\sum_{j \neq i} T_{ij} V_j + I_i\right] \Delta V_i. \qquad (10)$$

According to equation (8), $\Delta V_i$ is positive only when $\Sigma_{j \neq i} T_{ij} V_j + I_i$ is positive and is negative only when $\Sigma_{j \neq i} T_{ij} V_h + I_i$ is is negative. Thus, from equation (10) any change in E according to the algorithm of equation (8) is negative. Furthermore, E is bounded so that iterations of the algorithm will lead to stable states that do not change further with time.

In some neural networks, the relationship between the input and the output of a processing node is not given by the thresholding operation of equation (8). Instead, the network has a graded response and the relationship between the input and the output is given by a sigmoid monotonic activation function.

In this case the "equation of motion" for a processing node is $$\frac{du_i}{dt} = -\frac{u_i}{\tau_i} + \sum_{j \neq i} T_{ij} V_j + I_i, \qquad (11)$$

$V_j = g_j(u_j)$ for all $j$,

The function $g_j(u_j)$ is the sigmoid activation function of the processing node j and $\tau_i$ is a time constant. As the system evolves, due to feedback dynamics, the energy decreases until it reaches a minimum.

Illustratively, the function $V_j = g(u_j)$ is given by $V_j = g(u_j) = \frac{1}{2}(1 + tanh(\lambda u_j))$ Note that when $\lambda$ is very large the function $g(u_j)$ begins to act like the thresholding operation of equation (8).

A major advantage of the Hopfield network with a graded response is that it can be implemented with simple electronic circuits (see, e.g., J. Hutchinson et al, "Computing Motion Using Analog and Binary Resistive Networks", Computer pp 52-63, March 1988).

C. Object of the present Invention

In view of the foregoing, it is an object of the present invention to provide a neural network such as a Hopfield neural network for carrying out a probabilistic relaxation process.

SUMMARY OF THE INVENTION

The present invention is a neural network for implementing a probabilistic relaxation process. The inventive neural network comprises a plurality of interconnected processing nodes. Each node generates an output signal representing the time evolution of a probability that a particular object in a set of objects is a member of a particular class in a set of classes. The nodes are interconnected by weighted connection paths such that each node receives a time dependent input signal including a sum of weighted output signals of a plurality of the nodes and an externally generated signal. The weighting of a connection path between two nodes is dependent on a compatibility that the corresponding objects of the two nodes will be in the corresponding classes of the nodes. Each of the processing nodes has a transfer function so that its output signal is a monotonic non-linear function of its input signal.

The inventive network operates as follows. At the start, the output signal of each node is set to an initial estimate of the probability that a particular object in a set of objects is in a particular class in a set of classes. Because of the interconnections between the nodes, the output signals of each node evolve in time to a final state indicative of whether or not the particular object of the node is in the particular class of the node.

In this manner, the massive parallel execution capability of the inventive neural network is utilized to carry out a probabilistic relaxation process.

The inventive neural network is especially useful for image processing tasks such as classifying pixels (i.e. objects) into particular gray scale values (i.e. classes).

DETAILED DESCRIPTION OF THE INVENTION

Figure 1:
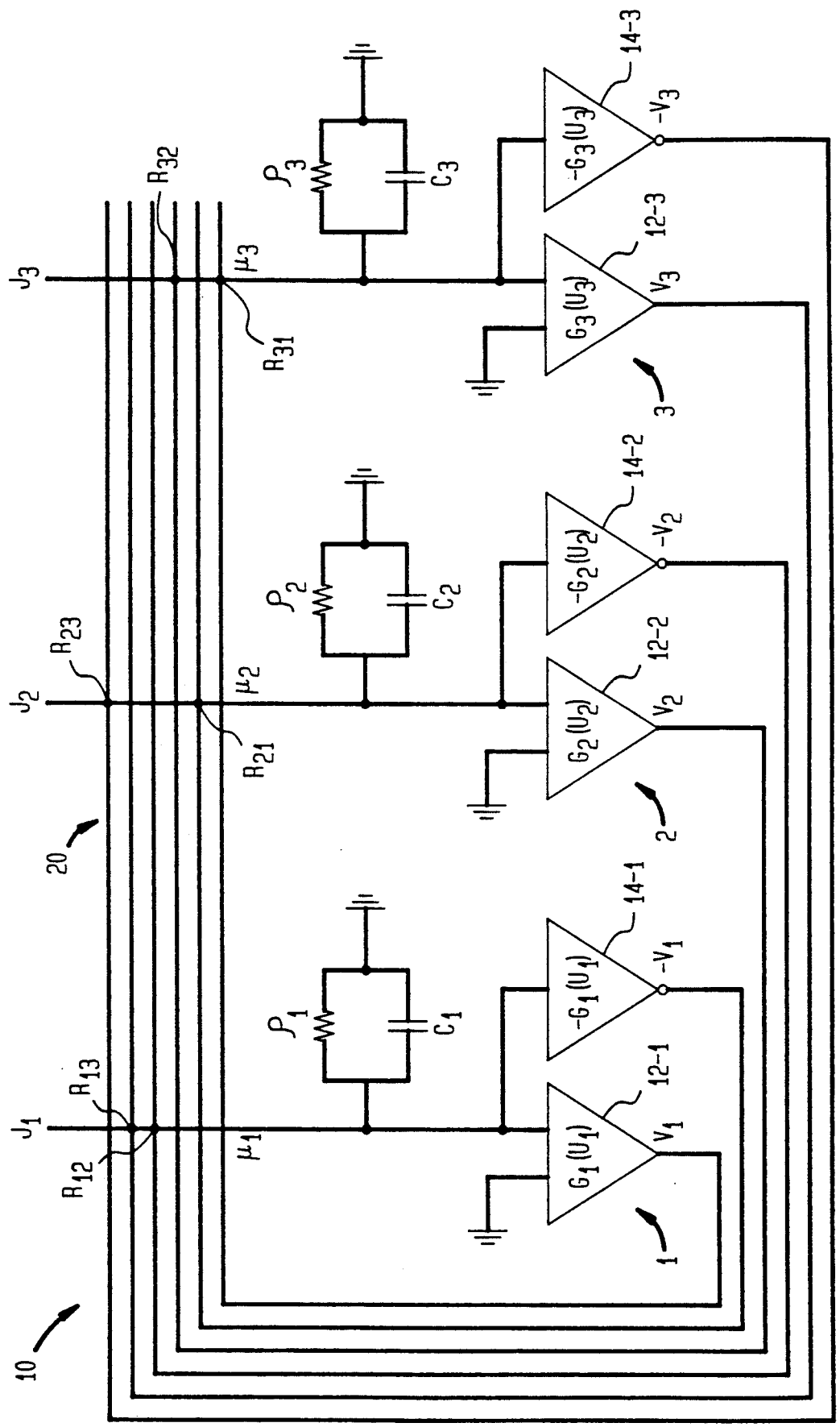
FIG. 1 schematically illustrates a neural network in accordance with the present invention.

FIG. 1 schematically illustrates a portion of a neural network 10 for implementing a probabilistic relaxation process in accordance with the present invention. Three processing nodes or neurons of the neural network 10 are illustrated in FIG. 1. These processing nodes are labeled 1,2,3. Each node 1,2,3 comprises an amplifier 12-1, 12-2, 12-3 with a non-linear transfer function $g_1(u_1)$, $g_2(u_2)$, $g_3(u_3)$, respectively. The signals $u_1$, $u_2$, $u_3$ are the input signals for the amplifiers 12-1, 12-2, 12-3, respectively. As indicated above, the functions $g_1(u_1)$, $g_2(u_2)$, $g_3(u_3)$ are the sigmoid activation functions of the nodes 1,2,3. Thus, the amplifiers 12-1, 12-2, 12-3, produce the output signals $V_1 = g_1(u_1)$, $V_2 = g_2(u_2)$ and $V_3 = g_3(u_3)$.

Figure 2:
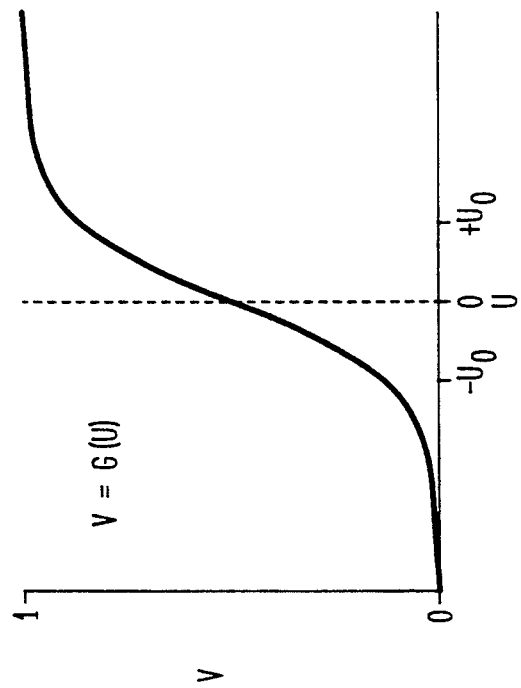
FIG. 2 illustrates the transfer function characteristic of one of the processing nodes in the neural network of FIG. 1.

Illustratively, the function $V_j = g_j(u_j)$ is plotted in FIG. 2. As can be seen in FIG. 2, $g_j(u_j)$ approaches zero asymtotically for large negative values of $u_j$ and approaches one asymtotically for large positive values of $u_j$. Thus, the output signal $v_j$ of a node is always positive.

Each amplifier 12-1, 12-2, 12-3, has an input resistance $\rho_1$, $\rho_2$, $\rho_3$ leading to a reference ground. Each amplifier 12-1, 12-2, 12-3, also has an input capacitance $C_1$, $C_2$, $C_3$.

The elements $T_{ij}$ of the connection matrix T may be positive or negative. In order to provide for both positive and negative values for particular matrix elements $T_{ij}$, each processing node 1,2,3 is provided with a normal positive output which is taken to be the output of the corresponding amplifier 12-1, 12-2, 12-3 and an inverted output which is produced by an inverting amplifier 14-1, 14-2, 14-3. The outputs of the inverting amplifiers are 14-1, 14-2, 14-3 are $-V_1 = -g_1(u_1)$, $-V_2 = -g_2(u_2)$, $-V_3 = g_3(u_3)$, respectively. The normal, i.e., non-inverted, output of each node is between zero and one, and the inverted output of each node is between zero and negative one.

A weighted connection path between two processing nodes may be defined by the matrix element $T_{ij}$. Illustratively $C_i T_{ij}$ is a conductance which connects one of the two outputs (i.e. non-inverting output or inverting output) of the node j to the input of the node i.

Each connection with weight $T_{ij}$ is made with a resistor $R_{ij} = 1/C_i |T_{ij}|$. If $T_{ij}$ is positive, the resistor is connected to the non-inverting output of the node j. If $T_{ij}$ is negative, the resistor is connected to the inverting output of the node j. The net input current to any node i (and hence the input voltage $u_i$) is the sum of the currents flowing through the set of resistors connecting its input to the outputs of other nodes. In addition, there is an externally supplied excitation current $J_i$ for each node. Thus, in FIG. 1, the externally supplied currents for the nodes 1,2,3 are $J_1$, $J_2$, $J_3$.

The resistors $R_{ij}$ are formed by a resistor network 20 in the neural network 10 of FIG. 1. Each "dot" in FIG. 1 represents a resistor in the network 20. For example, the resistor $R_{12}$ connects the inverted output of node 2 to node 1. Similarly, $R_{32}$ connects the non-inverted2 output of node 2 to node 3.

Figure 3:
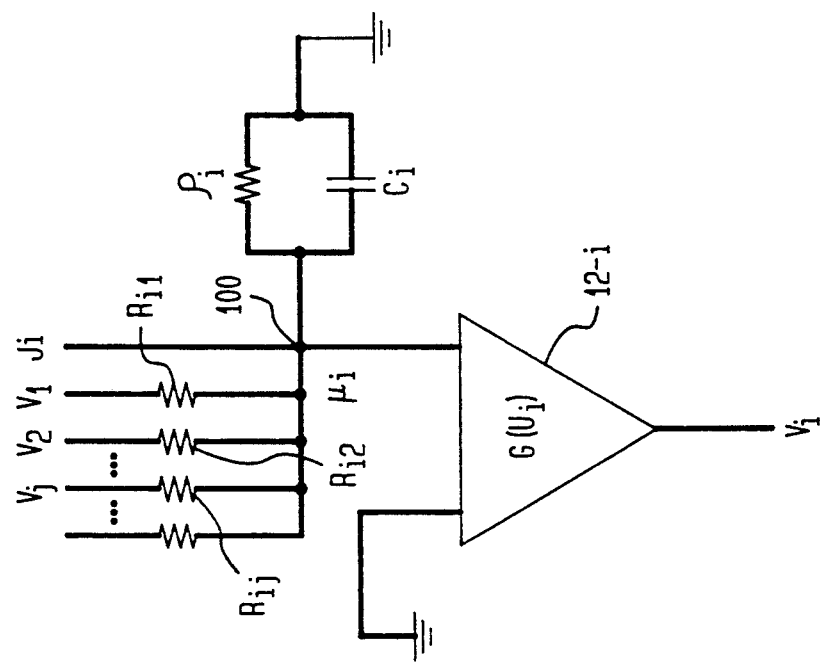
FIG. 3 schematically illustrates the inputs to one of the processing nodes of the neural network of FIG. 1 in greater detail.

FIG. 3 shows the inputs to the amplifier 12-i of the node i of FIG. 1 in greater detail. An equation of motion may be derived for this amplifier by applying current conservation at the point 100. The voltage $u_i$ is the input voltage to the amplifier 12-i and the amplifier 12-i is assumed to have a very large input impedance. The currents leaving the point 100 at the currents $u_i/\rho_i$ through the input resistance $\rho_i$ and the current $c_i du_i/dt$ through the input capacitance $c_i$. The currents arriving at the point are the external current $J_i$ and the currents $(v_j - u_i) R_{ij}$ from the other nodes 0 which are connected to the node i through the resistors $R_{ij}$. By equating the currents leaving and arriving at the point 100 an equation of motion is determined.

Thus, the time evolution of the neural network 10 of FIG. 1 is given by the equation of motion $$C_i(du_i/dt) = \Sigma_j V_j/R_{ij} - u_i/R_i + J_i \quad (13)$$

where $R_i$ is a parallel combination of $\rho_i$ and $R_{ij}$ such that $$1/R_i = 1/\rho_i + \Sigma_j 1/R_{ij} \quad (14)$$

The equation (13) can be rewritten as $$du_i/dt = \Sigma_j T_{ij} V_j - u_i/\tau_i + I_i \quad (15)$$

where $\tau_i = C_i R_i$ and $I_i = J_i/C_i$.

For simplicity of implementation, $C_i$ is the same for all the nodes, $\rho_i$ is the same for all the nodes and all of the nodes have the same non-linear transfer function g given by equation (12) above. The parameter $\lambda$ in equation (12) may be set equal to 100. In addition, the time constants of the amplifiers 12 and 14 are negligible, i.e., these amplifiers are fast.

It should be noted that while FIG. 1 illustrates three nodes, in general, the neural network 10 contains numerous nodes.

The neural network 10 of FIG. 1 is specifically designed to carry out a probabilistic relaxation process. The probabilistic relaxation process may be viewed as a process which increases iteratively the value of a goodness function. A goodness function for a probabilistic relaxation is given by $$\sum_i \sum_j p_{ij} \left( \sum_h \sum_k c(i,j;h,k) p_{hk} \right). \quad (16)$$

Let each node in a Hopfield network with graded response such as the network 10 have an index $i_{ij}$. (In this case ij is intended to represent a single index). The output signal of the node $v_{ij}$ represents the probability $P_{ij}$ that an object $A_i$ is in class $C_j$.

It is then possible to define the following energy function for the neural network:

$$E = - \frac{A}{2} \sum_i \sum_j V_{ij} \left( \sum_h \sum_k c(i,j;h,k) V_{hk} \right) + \frac{B}{2} \sum_i \left( \left( \sum_j V_{ij} \right) - 1 \right)^2 \quad (17)$$

The first term in equation (17) is identical to equation (16) except for the constant value $-A/2$. The second term in equation (17) is minimized to zero when the sum of the outputs of the nodes representing different possible class assignments of a particular object is equal to 1 (i.e.:

$$\sum_j p_{ij} = 1$$

for all objects i). Both A and B are positive numbers and illustratively are set equal to one. Equation (17) may be expanded as $$E = - \frac{A}{2} \sum_i \sum_j \sum_h \sum_k c(i,j;h,k) V_{ij} V_{hk} + \quad (18)$$

$$\frac{B}{2} \sum_i \left( \left( \sum_j V_{ij} \right)^2 - 2 \left( \sum_j V_{ij} \right) + 1 \right)$$

$$= - \frac{A}{2} \sum_i \sum_j \sum_h \sum_k c(i,j;h,k) V_{ij} V_{hk} +$$

$$\frac{B}{2} \sum_i \left( \sum_j V_{ij} \right)^2 - B \sum_i \sum_j V_{ij} + \frac{nB}{2} .$$

where n is the number of objects (i.e., i in equation 18 takes on the values 1,2, ..., n). By comparing equations 9 and 18, and neglecting the constant term, it is possible to determine each connection matrix element $T_{(ij)(hk)}$. which is the weight of the connection path between the node (hk) and the node (ij), as well as the external excitation $I_{ij}$ for the node ij. These are given as follows:

$$T_{(ij)(hk)} = A \times c(i,j;h,k) - B \times \delta_{ih} \quad (19)$$

$$I_{ij} = B \quad (20)$$

where $\delta_{ih} = 1$ for i=h, 0 for i≠h. Note that the subscripts (ij) and (hk) of T in equation (19) are considered to be two single indices.

To insure that the inventive neural network will converge fully, sometimes the compatibility coefficients have to be modified. In particular, the compatibility coefficients are modified to insure that the matrix of compatibility coefficients is symmetric and to insure that the diagonal elements in the matrix of compatibility coefficients is zero. The modification of the compatibility coefficients is specified in equation (21) and (22) below.

$$c((x,y),j;(u,v),k) \leftarrow \frac{c((x,y),j;(u,v),k) + c((u,v),k;(x,y),j)}{2}, \quad (21)$$

$$c((x,y),j;(x,y),j) \leftarrow 0. \quad (22)$$

When a Hopfield neural network has a connection matrix in accordance with equations 19, 21, and 22, the network converges to a stable final state.

To utilize the inventive neural network for carrying out a probabilistic relaxation process, it is first necessary to provide values for $T_{(ij)(hk)}$ and $I_{ij}$. These parameter values fully determine the physical characteristics of the network. Once the values of $T_{(ij)(hk)}$ and $I_{ij}$ are set, the final state of the neural network will depend only on the initial state. Thus, it is necessary to set an initial output signal $V_{ij}$ of each node ij which represents the initial probability $p^{(0)}_{ij}$ that object i is in class j. To provide the nodes with their initial output signal values, the input voltage $u_{ij}$ of each node is initially set to:

$$u_{ij} = g_{ij}^{-1}(p_{ij}^{(0)}) \quad (23)$$

The probabilistic relaxation process is a determinative iterative process. Thus, once the initial output signal are set, the output signal $v_{ij}$ of each node evolves to a final stable state of zero or one (i.e. $P_{ij}$ evolves to zero or one) which definitely indicates whether or not the object i is in the class j.

Illustratively, the inventive neural network may be utilized to carry out the above-described thresholding process for an image. In particular, the neural network is utilized to classify each pixel in an image into an object class or a background class based on a gray level of the pixel. As indicated above, this example is especially simple for two reasons:

1) There are only two classes 1 and 0, corresponding to object and background gray levels.

2) The compatibilities between neighboring pairs of points should all be alike, independent of direction, unless the picture is directionally biased.

Thus, for each pixel $A_{x,y}$, with coordinates x and y, there are only two probabilities $P_{(x,y)0}$ and $p_{(x,y)1}$, where $P_{x,y)1} = 1 - p_{(x,y)0}$. Moreover, for each pixel $A_{x,y}$ and any of its eight neighboring pixels, with coordinates u, v, there are only four compatibilities c((x,y),0;(u,v),0),c((x,y),0;(u,v),1) c((x,y),1;(u,v),0) and c((x,y),1,(u,v),1). All other compatibilities are assumed to be zero in this example.

As indicated above, to assign an initial probability values to each pixel, the following scheme may be utilized (see e.g. A. Rosenfeld and R. C. Smith, "Thresholding Using Relaxation", IEEE Transactions On Pattern Analysis and Machine Intelligence, pAMI-3:508-606.1981). Let $G_{x,y}$ be the gray level of pixel $A_{x,y}$, m be the mean gray level, and let 0 and B be the gray levels corresponding to object and background, then it is defined:

$$p_{(x,y)1}^{(0)} = \frac{1}{2} + \frac{G_{x,y} - m}{2(B - m)} \text{ for } G_{x,y} > m \quad (5)$$

$$p_{(x,y)0}^{(0)} = \frac{1}{2} + \frac{m - G_{x,y}}{2(m - O)} \text{ for } G_{x,y} \leq m. \quad (6)$$

A general method of defining compatibility coefficients based on the mutual information of the classes at neighboring pixels was proposed in S. Peleg et al, "Determining Compatibility Coefficients for Curve Enhancement Relaxation Processes", IEEE Trans. on Systems, Man and Cybernetics, SMC 8:548-555 July 1978.

The compatibility coefficients computed by this method are shown in Table 1. In Table 1, the element in row (j,k) and column (x,y);(u,v) is the coefficient c((x,y),j;(u,v),k).

TABLE 1

| | (x,y); (u,v) | | |
|---|---|---|---|
| (j,k) | (x,y); (x − 1, y − 1) | (x,y); (x − 1,y) | (x,y); (x − 1, y + 1) |
| 0;0 | 0.0034 | 0.0036 | 0.0033 |
| 0;1 | −0.0280 | −0.0313 | −0.0278 |
| 1;0 | −0.0346 | −0.0348 | −0.0343 |
| 1;1 | 0.0004 | 0.0021 | 0.0009 |

| | (x,y); (u,v) | | |
|---|---|---|---|
| (j,k) | (x,y); (x,y − 1) | (x,y); (x,y) | (x,y); (x,y + 1) |
| 0;0 | 0.0037 | 0.0202 | 0.0038 |
| 0;1 | −0.0315 | −0.0612 | −0.0315 |
| 1;0 | −0.0347 | −0.0612 | −0.0346 |
| 1;1 | 0.0021 | 0.0199 | 0.0024 |

| | (x,y); (u,v) | | |
|---|---|---|---|
| (j,k) | (x,y); (x + 1, y − 1) | (x,y); (x + 1,y) | (x,y); (x + 1, y + 1) |
| 0;0 | 0.0035 | 0.0038 | 0.0037 |
| 0;1 | −0.0278 | −0.0313 | −0.0280 |
| 1;0 | −0.0342 | −0.0346 | −0.0343 |
| 1;1 | 0.0008 | 0.0024 | 0.0009 |

Theoretically, the compatibility coefficients generated from mutual information are symmetric (i.e. c(i,j;h,k)=c(h,k;i,j) but the compatibility coefficients shown in Table 1 are not symmetric because they are influenced by the boundary pixels of the original image. Thus, the compatibility coefficients of Table 1 are modified in accordance with equations 21 and 22 to produce new compatibility coefficients which are listed in Table 2.

TABLE 2

| | (x,y); (u,v) | | |
|---|---|---|---|
| (j,k) | (x,y); (x − 1, y − 1) | (x,y); (x − 1,y) | (x,y); (x − 1, y + 1) |
| 0;0 | 0.0036 | 0.0037 | 0.0034 |
| 0;1 | −0.0311 | −0.0329 | −0.0310 |
| 1;0 | −0.0313 | −0.0330 | −0.0310 |
| 1;1 | 0.0007 | 0.0023 | 0.0009 |

| | (x,y); (u,v) | | |
|---|---|---|---|
| (j,k) | (x,y); (x,y − 1) | (x,y); (x,y) | (x,y); (x,y + 1) |
| 0;0 | 0.0037 | 0.0000 | 0.0037 |
| 0;1 | −0.0331 | −0.0612 | −0.0331 |
| 1;0 | −0.0331 | −0.0612 | −0.0331 |
| 1;1 | 0.0023 | 0.0000 | 0.0023 |

| | (x,y); (u,v) | | |
|---|---|---|---|
| (j,k) | (x,y); (x + 1, y − 1) | (x,y); (x + 1,y) | (x,y); (x + 1, y + 1) |
| 0;0 | 0.0034 | 0.0037 | 0.0036 |
| 0;1 | −0.0310 | −0.0330 | −0.0313 |
| 1;0 | −0.0310 | −0.0329 | −0.0311 |
| 1;1 | 0.0009 | 0.0023 | 0.0007 |

Once the compatibility coefficients and initial probability values are determined in the manner discussed above, the neural network evolves to a final state, i.e., each output signal becomes zero or one, indicating definitively whether a pixel is in the object or background gray scale.

In short, a neural network for implementing a probabilistic relaxation has been disclosed. The above-described embodiments of the invention are intended to be illustrative only. Numerous alternative embodiments may be devised by those skilled in the art without departing from the spirit and scope of the following claims.

I claim:

1. A neural network for implementing a probabilistic relaxation process comprising
   a plurality of interconnected processing nodes, each node generating an output signal representing the time evolution of a probability that a particular object in a set of objects is a member of a particular class in a set of classes,
   said nodes being interconnected by weighted connection paths such that each node receives a time dependent input signal including a sum of weighted input signals of a plurality of said nodes and an externally generated input signal, the weighting of a connection path connecting two particular nodes being dependent on a compatibility that the corresponding objects of the nodes will be in the corresponding classes of the nodes.
   each of said processing nodes having a transfer function characteristic so that its output signal is a monotonic non-linear function of its input signal,
   wherein when the output signal of each node is first set to an initial estimated value of the probability that a particular object in a set of objects is a member of a particular class in a set of classes, said output signal of each node evolves over time due to the interconnection between said nodes to a constant final value indicative of whether or not a particular object is in a particular class,
   wherein said neural network has an energy function $$E = -A/2 \sum_i \sum_j \sum_h \sum_k c(i,j; h, k) V_{ij} V_{hk} +$$

$$B/2 \sum_i \left( \sum_j V_{ij} \right)^2 - B \sum_i \sum_j V_{ij} + n B/2$$

wherein
A and B are positive numbers
$c(i,j; h,k)$ is the compatibility that an object i is in a class j and an object h is in a class k.
$V_{ij}$ is the output signal of a node with index ij
$V_{hk}$ is the output signal of a node with index hk
n is the number of objects.

2. The neural network of claim 1 wherein the output signal of each node represents the probability that a particular pixel in an image has a particular gray scale value and the weighting signal of each connection path represents the compatibility of two particular pixels having two particular gray scale values.

3. The neural network of claim 1, wherein each of said processing nodes is an analog circuit.

4. The neural network of claim 3 wherein each of said processing nodes comprises amplifier means for generating a positive output signal and a negative output signal and wherein each of said weighted connection paths comprises a conductive path including a resistor.

5. The neural network of claim 1 wherein the weighting connection between said node with index ij and said node with index hk is given by $$T_{(ij)(hk)} = Ac(i,j; h,k) - B\delta_{ij}$$

where
$\delta_{ij} = 1$ for $i = h$ and
$\delta_{ij} = 0$ for $i \neq h$, and
wherein said externally generated input signal $I_{ij}$ of a node with index ij is B.

6. In a neural network comprising a plurality of processing nodes interconnected by weighted interconnection paths, wherein the input signal to each processing node includes a weighted sum of the output signals of a plurality of said processing nodes and an external signal, wherein the output signal of each processing node is a probability that a particular object in a set of objects is a member of a particular class in a set of classes, and is a non-linear monotonic function of the input signal, and wherein the weight of each interconnection path between two nodes is dependent on a compatibility that the corresponding objects of the two nodes are in the corresponding classes, a method for carrying out a probabilistic relaxation comprising,
   setting the output signal of each node to an initial estimated value of the probability that a particular object in a set of objects is in a particular class in a set of classes, and
   causing the output signal of each of said nodes to evolve in time because of the transmission of signals via the interconnection paths between said nodes to a final state indicative of whether or not the particular object of each node is in the particular class, wherein
   wherein said neural network has an energy function $$E = -A/2 \sum_i \sum_j \sum_h \sum_k c(i,j; h, k) V_{ij} V_{hk} +$$

$$B/2 \sum_i \left( \sum_j V_{ij} \right)^2 - B \sum_i \sum_j V_{ij} + n B/2$$

wherein
A and B are positive numbers
$c(i,j; h,k)$ is the compatibility that an object i is in a class j and an object h is in a class k,
$V_{ij}$ is the output signal of a node with index ij
$V_{hk}$ is the output signal of a node with index hk
n is the number of objects.

7. The method of claim 6 wherein said step of setting the output signal of each node comprises setting the input signal of each node so that the output signal of each node is set to said initial probability estimate.

8. An electronic network comprising
   electronic means for generating a plurality of time dependent output signals, each of said output signals initially representing a first estimated value of the probability that a particular object in a set of objects is a member of a particular class in a set of classes and evolving in time to a final state which indicates definitively whether the particular object is in the particular class,
   said electronic means comprising a plurality of processing nodes, each of which generates one of said output signals, and means for forming an input signal for each of said nodes by multiplying the output signal of each of a plurality of said nodes by a compatibility coefficient indicative of the compatibility between the object and class of the node from which the output signal is taken and the object and class of the node for which the input signal is being generated and summing the resulting products, each of said nodes having a non-linear transfer function between its input and its output, wherein said neural network has an energy function $$E = -A/2 \sum_i \sum_j \sum_h \sum_k c(i,j;h,k) V_{ij} V_{hk} +$$

-continued $$B/2 \sum_i \left( \sum_j V_{ij} \right)^2 - B \sum_i \sum_j V_{ij} + n B/2$$

wherein
 A and B are positive numbers
 $c(i,j;h,k)$ is the compatibility that an object i is in a class j and an object h is in a class k,
 $V_{ij}$ is the output signal of a node with index ij
 $V_{hk}$ is the output signal of a node with index hk
 n is the number of objects.

* * * * *